United States Patent
Zhao et al.

(10) Patent No.: US 12,260,675 B2
(45) Date of Patent: Mar. 25, 2025

(54) PERSON RE-IDENTIFICATION METHOD, SYSTEM AND DEVICE, AND COMPUTER-READABLE STORAGE MEDIUM

(71) Applicant: SUZHOU METABRAIN INTELLIGENT TECHNOLOGY CO., LTD., Jiangsu (CN)

(72) Inventors: Yaqian Zhao, Jiangsu (CN); Li Wang, Jiangsu (CN); Baoyu Fan, Jiangsu (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/718,411

(22) PCT Filed: Sep. 19, 2022

(86) PCT No.: PCT/CN2022/119678
§ 371 (c)(1),
(2) Date: Jun. 10, 2024

(87) PCT Pub. No.: WO2023/206935
PCT Pub. Date: Nov. 2, 2023

(65) Prior Publication Data
US 2024/0420503 A1    Dec. 19, 2024

(30) Foreign Application Priority Data
Apr. 30, 2022    (CN) .................. 202210469141.2

(51) Int. Cl.
G06V 40/16    (2022.01)
G06T 7/13     (2017.01)
(Continued)

(52) U.S. Cl.
CPC .............. *G06V 40/173* (2022.01); *G06T 7/13* (2017.01); *G06V 10/25* (2022.01); *G06V 10/751* (2022.01);
(Continued)

(58) Field of Classification Search
None
See application file for complete search history.

(56) References Cited

U.S. PATENT DOCUMENTS

2018/0173963 A1* 6/2018 Taylor .................... G06V 20/52
2020/0226421 A1* 7/2020 Almazan ................ G06N 3/045
(Continued)

FOREIGN PATENT DOCUMENTS

CN    110569779 A    12/2019
CN    111027442 A    4/2020
(Continued)

OTHER PUBLICATIONS

C. Su, J. Li, S. Zhang, J. Xing, W. Gao, and Q. Tian, "Pose-driven deep convolutional model for person re-identification," in Proc. IEEE Int. Conf. Comput. Vis., 2017, pp. 3960-3969. (Year: 2017).*
(Continued)

*Primary Examiner* — Ian L Lemieux
(74) *Attorney, Agent, or Firm* — Cooper Legal Group, LLC

(57) ABSTRACT

The present application discloses a person re-identification method, system and device, and a computer-readable storage medium. The method includes: obtaining a first type of person image without a label; making label information for the first type of person image; training a target person re-identification network on the basis of the first type of person image and the label information to obtain a first trained target person re-identification network; extracting a region of interest in the first type of person image; and
(Continued)

training, on the basis of the first type of person image and the region of interest, the first trained target person re-identification network to obtain a second trained target person re-identification network, and performing person re-identification on the basis of the target person re-identification network.

19 Claims, 7 Drawing Sheets

(51) Int. Cl.
  *G06V 10/25* (2022.01)
  *G06V 10/75* (2022.01)
  *G06V 10/771* (2022.01)
  *G06V 20/70* (2022.01)

(52) U.S. Cl.
  CPC ............ *G06V 10/771* (2022.01); *G06V 20/70* (2022.01); *G06T 2207/20081* (2013.01)

(56) References Cited

U.S. PATENT DOCUMENTS

| | | | | |
|---|---|---|---|---|
| 2021/0319215 | A1* | 10/2021 | Zhang | G06V 10/774 |
| 2022/0374630 | A1* | 11/2022 | Huang | G06F 18/214 |
| 2024/0420456 | A1* | 12/2024 | Li | G06V 10/82 |

FOREIGN PATENT DOCUMENTS

| CN | 112541448 | A | | 3/2021 |
|---|---|---|---|---|
| CN | 112766218 | A | | 5/2021 |
| CN | 112836611 | A | | 5/2021 |
| CN | 113947101 | A | | 1/2022 |
| CN | 114596592 | A | | 6/2022 |
| CN | 114743101 | A | * | 7/2022 |

OTHER PUBLICATIONS

Somers et al. Body part-based representation learning for occluded person Re-Identification. In: IEEE/CVF Winter Conf. Appl. Comput. Vis. (WACV), 1613-1623. Inst. Electr. Electron. Eng. (IEEE), Waikoloa, HI, USA. (2023) https://doi.org/10.1109/wacv56688.2023. 00166 (Year: 2023).*

Mang Ye et al. Deep Learning for Person Re-Identification: A Survey and Outlook. In: IEEE Transactions on Pattern Analysis and Machine Intelligence, vol. 44, No. 6, pp. 2872-2893 Jun. 2022 (Year: 2022).*

Y. Sun et al., "Perceive where to focus: Learning visibility-aware part-level features for partial person re-identification," in Proc. IEEE/CVF Conf. Comput. Vis. Pattern Recognit. Workshops, 2019, pp. 393-402. (Year: 2019).*

Corresponding International Patent Application No. PCT/CN2022/ 119678, International Search Report, Date Mailed Jan. 16, 2023.

Corresponding International Patent Application No. PCT/CN2022/ 119678, Written Report, Date Mailed Jan. 13, 2023.

Corresponding Chinese Patent Application No. CN202210469141. 2, First Office Action dated Jun. 15, 2022.

Corresponding Chinese Patent Application No. CN202210469141. 2, Notification to Grant Patent dated Jun. 30, 2022.

* cited by examiner

PERSON RE-IDENTIFICATION METHOD, SYSTEM AND DEVICE, AND COMPUTER-READABLE STORAGE MEDIUM

CROSS-REFERENCE TO RELATED APPLICATION

This application is the national phase application of International Patent Application No. PCT/CN2022/119678, filed Sep. 19, 2022, which claims priority to Chinese Patent Application No. 202210469141.2, filed on Apr. 30, 2022 in China National Intellectual Property Administration and entitled "Person Re-identification Method, System and Device, and Computer-Readable Storage Medium". The contents of International Patent Application No. PCT/CN2022/119678 and Chinese Patent Application No. 202210469141.2 are each incorporated by reference herein in their entireties.

FIELD

The present application relates to a technical field of deep learning, and more particularly, to a person re-identification method, system and device, and a computer-readable storage medium.

BACKGROUND

At present, deep learning has been used for solving problems in a field of computer vision, such as picture classification, image segmentation, and object detection, and has achieved great success. In recent years, many excellent convolutional neural network models have emerged. In this process, person re-identification tasks have made considerable progress with continuous development of a deep learning technology. Person Re-identification (Re-ID) is an important image identification technology that is now considered as a type of key sub-problems in image retrieval, which matches person images or videos across devices by using a computer vision algorithm, that is, a query image is given, and a same person is retrieved from image libraries of different monitoring devices. Due to great application prospects in aspects of intelligent security, photo album clustering, suspect search, and the like, the Re-ID has become a research focus in the field of computer vision.

At present, during the Re-ID, a person re-identification network is constructed, the person re-identification network is trained on a basis of a person image with a label, and finally, the Re-ID is performed on a basis of the trained person re-identification network. However, the inventor has realized that a training process of an existing person re-identification network is slow, resulting in low operating efficiency of a person re-identification method, poor robustness of the person re-identification network, and poor applicability of the method.

SUMMARY

A first aspect of the present application provides a person re-identification method, including:
 obtaining a first type of person image without a label;
 making label information for the first type of person image;
 training a target person re-identification network on a basis of the first type of person image and the label information to obtain a first trained target person re-identification network;
 extracting a region of interest in the first type of person image; and
 training, on a basis of the first type of person image and the region of interest, the first trained target person re-identification network to obtain a second trained target person re-identification network, and performing person re-identification on a basis of the target person re-identification network.

Another aspect of the present application provides a person re-identification system, including:
 a first obtaining module, configured to obtain a first type of person image without a label;
 a first making module, configured to make label information for the first type of person image;
 a first training module, configured to train a target person re-identification network on a basis of the first type of person image and the label information to obtain a first trained target person re-identification network;
 a second making module, configured to extract a region of interest in the first type of person image; and
 a second training module, configured to train, on the basis of the first type of person image and the region of interest, the first trained target person re-identification network to obtain a second trained target person re-identification network, and perform person re-identification on the basis of the target person re-identification network.

Still another aspect of the present application provides a person re-identification device, including:
 a memory, configured to store computer-readable instructions; and
 one or more processors, configured to implement steps of any person re-identification method described above when executing the computer-readable instructions.

Yet another aspect of the present application further provides a non-transitory computer-readable storage medium. The non-transitory computer-readable storage medium described above stores computer-readable instructions. The computer-readable instructions described above implement steps of any person re-identification method described above when executed by one or more processors.

BRIEF DESCRIPTION OF THE DRAWINGS

In order to describe embodiments of the present application or technical solutions in the existing art more clearly, drawings required to be used in the embodiments or the description of the existing art will be briefly introduced below. Apparently, the drawings in the description below are merely some embodiments of the present application. Those of ordinary skill in the art can also obtain other drawings according to the provided drawings without creative work.

DETAILED DESCRIPTION

Technical solutions in the embodiments of the present application will be clearly and completely described below with reference to the accompanying drawings in the embodiments of the present application. Apparently, the described embodiments are merely part rather than all embodiments of the present application. Based on the embodiments in the present application, all other embodiments obtained by those of ordinary skill in the art without creative work fall within the scope of protection of the present application.

Figure 1:
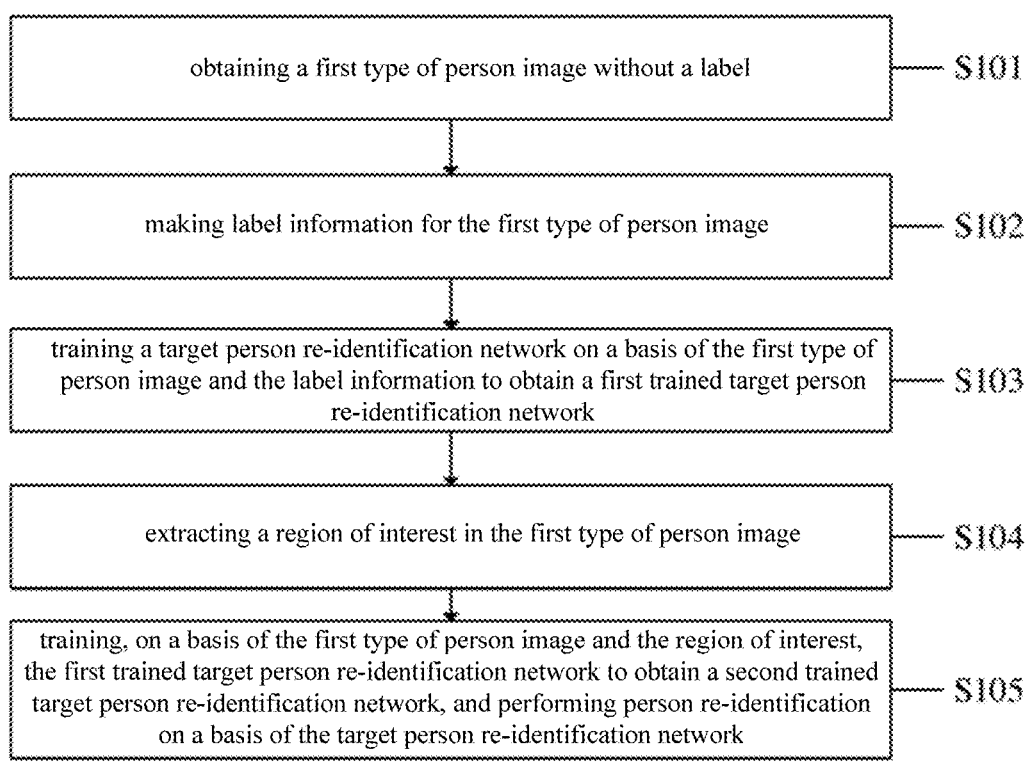
FIG. 1 is a flowchart of a person re-identification method according to one or more embodiments of the present application.

Please refer to FIG. 1, which is a flowchart of a person re-identification method according to an embodiment of the present application.

The person re-identification method according to the embodiment of the present application may include following steps:

Step S101: obtaining a first type of person image without a label.

In practical applications, the first type of person image without the label may be obtained first. Both a type and an obtaining manner of the first type of person image may be determined according to actual needs.

Step S102: making label information for the first type of person image.

In practical applications, after the first type of person image without the label is obtained, the label information may be made for the first type of person image, so as to perform weak supervision training on a target person re-identification network subsequently on a basis of the label information.

Step S103: training the target person re-identification network on a basis of the first type of person image and the label information to obtain a first trained target person re-identification network.

In practical applications, after the label information is made for the first type of person image, the target person re-identification network may be trained on the basis of the first type of person image and the label information to obtain the first trained target person re-identification network.

In an application scenario, in a process of training the target person re-identification network on the basis of the first type of person image and the label information to obtain the first trained target person re-identification network, to facilitate training the target person re-identification network, the target person re-identification network may be connected to a first auxiliary network to obtain a first target network. The first target network is trained on the basis of the first type of person image and the label information to obtain a trained first target network. The first auxiliary network is removed from the first target network to obtain the first trained target person re-identification network.

Figure 2:
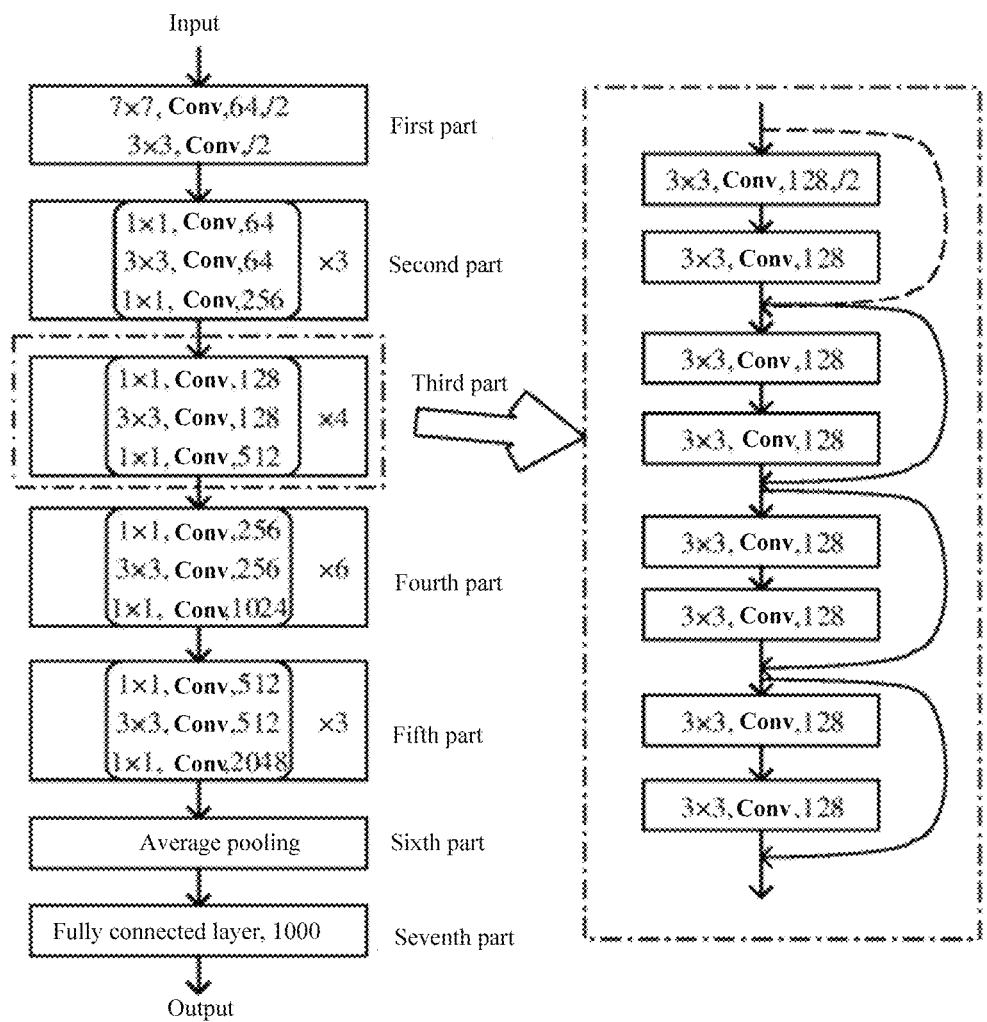
FIG. 2 is a schematic structural diagram of a ResNet50 network.

In an application scenario, the target person re-identification network includes a ResNet50 network. A structure of the ResNet50 network may be shown in FIG. 2. A first part does not contain a residual block, and mainly performs calculations of convolution (conv), regularization, activation function, and maximum pooling on an input. Structures of a second part, a third part, a fourth part, and a fifth part contain residual blocks. Each residual block contains three layers of convolution. After convolution calculation of the first five parts, a pooling layer converts the input into a feature vector, and finally, a classifier calculates this feature vector and outputs a coordinate regression value. The first auxiliary network includes a fully connector layer connected to a seventh part of the ResNet50 network. A size of the fully connected layer may be determined according to actual needs, for example, the fully connected layer may be a fully connected layer that contains three neurons.

It is to be noted that a loss function of the first auxiliary network may be determined according to actual needs, which is not limited here in the present application. For example, the loss function of the first target network may include:

$$\text{Loss} = \text{smooth}_{h_0} + \text{smooth}_{h_1} + \text{smooth}_{h_2} + \text{smooth}_{h_3};$$

$$\text{smooth}_{h_0}(x_0) = \begin{cases} 0.5(h_0 - x_0)^2 & \text{if } |h_0 - x_0| < 1 \\ |h_0 - x_0| & \text{otherwise} \end{cases};$$

$$\text{smooth}_{h_1}(x_1) = \begin{cases} 0.5(h_1 - x_1)^2 & \text{if } |h_1 - x_1| < 1 \\ |h_1 - x_1| & \text{otherwise} \end{cases};$$

$$\text{smooth}_{h_2}(x_2) = \begin{cases} 0.5(h_2 - x_2)^2 & \text{if } |h_2 - x_2| < 1 \\ |h_2 - x_2| & \text{otherwise} \end{cases};$$

$$\text{smooth}_{h_3}(x_1) = \begin{cases} 0.5(h_3 - x_3)^2 & \text{if } |h_3 - x_3| < 1 \\ |h_3 - x_3| & \text{otherwise} \end{cases};$$

Where, Loss represents a loss function value, $[x_0, x_1, x_2, x_3]$ represents label information output by the first target network, and $[h_0, h_1, h_2, h_3]$ represents label information made.

Step S104: extracting a region of interest in the first type of person image.

Step S105: training, on a basis of the first type of person image and the region of interest, the first trained target person re-identification network to obtain a second trained target person re-identification network, and performing person re-identification on a basis of the target person re-identification network.

In practical applications, to further perform the weak supervision training on the target person re-identification image, the region of interest in the first type of person image may be extracted after the target person re-identification network is trained on the basis of the first type of person image and the label information to obtain the first trained target person re-identification network, and the first trained target person re-identification network may be trained on the basis of the first type of image and the region of interest to obtain the second trained target person re-identification network.

In an application scenario, in a process of training the first trained target person re-identification network on the basis of the first type of person image and the region of interest to obtain the second trained target person re-identification network, to facilitate training the target person re-identification network, the first trained target person re-identification network may be connected to a second auxiliary network to obtain a second target network. The second target network may be trained on the basis of the first type of person image and the region of interest to obtain a trained second target network. The second auxiliary network may be removed from the second target network to obtain the second trained target person re-identification network, and person re-identification may be performed on the basis of the target person re-identification network.

Figure 3:
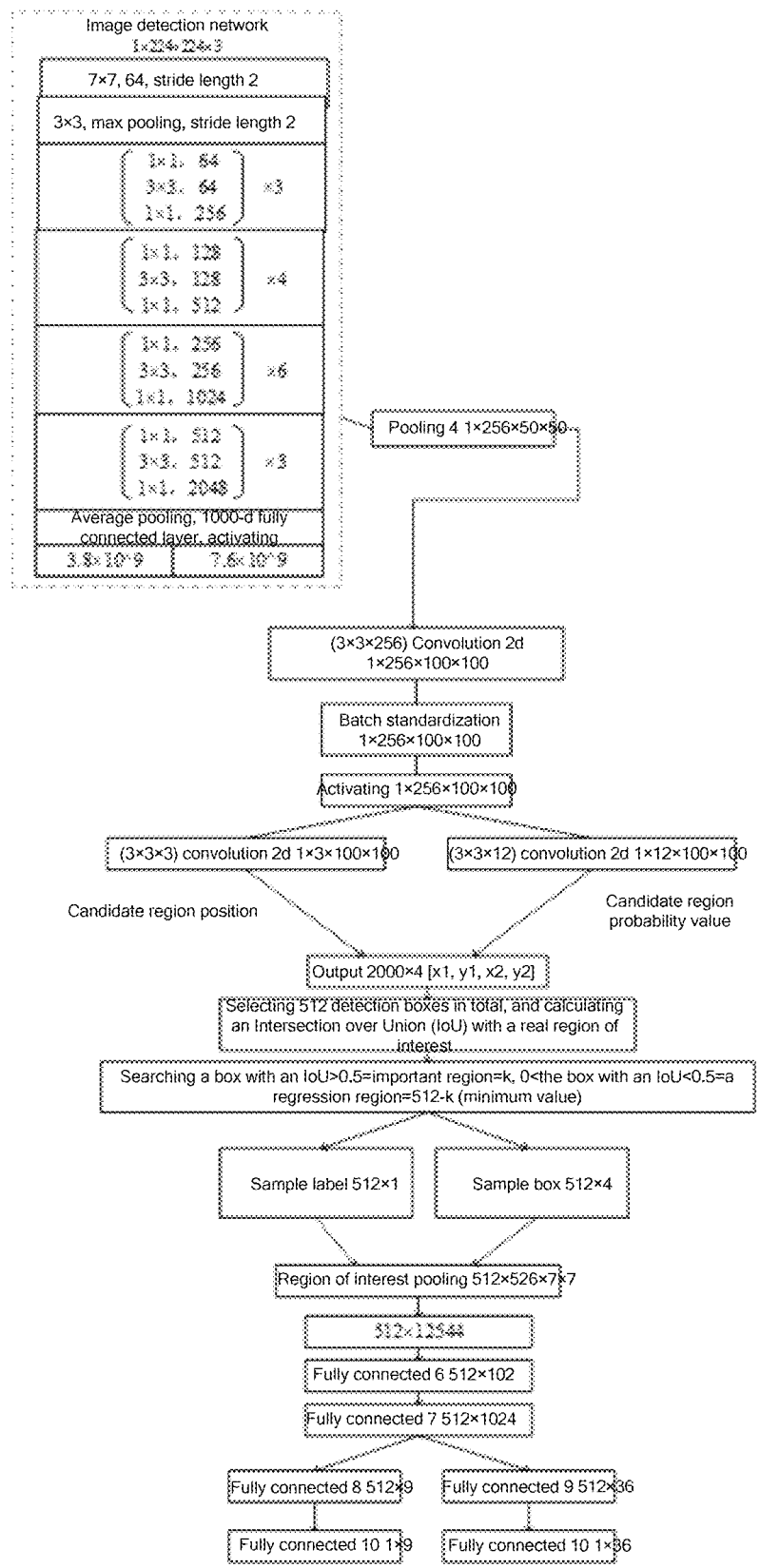
FIG. 3 is a schematic structural diagram of a second auxiliary network.

In an application scenario, the target person re-identification network may include the ResNet50 network. The second auxiliary network may include an image detection network connected to a feature map of a pooling layer of a sixth part of the ResNet50 network. The image detection network includes a candidate region determination network, a candidate region selection network, and a region of interest regression network. For example, the image detection network may be a Region Proposal Network (RPN) network. A structure of the second auxiliary network may be shown in FIG. 3. A structure from a layer Pool4 to an output layer belongs to the candidate region determination network. A structure from the output layer and a Roi pooling layer belongs to the candidate region selection network. The Roi pooling layer and subsequent structures belong to the region of interest regression network. An input feature of the RPN is first converted into a 256-dimensional feature map through a 3×3 convolution kernel, and then classification and coordinate regression are performed on an Anchor box of each pixel on the extracted 256-dimensional feature map through two 1×1 convolution kernels. A function of a classification layer is to distinguish whether this region is a foreground or a background, and a relative probability fraction is given. A regression layer is to output four coordinate offsets relative to an original map, and then a final candidate box is obtained according to an Intersection over Union (IOU) with ground truth.

In an application scenario, after the first trained target person re-identification network is trained on the basis of the first type of person image and the region of interest to obtain the second trained target person re-identification network, a third type of person image with a label may be obtained, the second trained target person re-identification network may be trained on the basis of the third type of person image to obtain a trained target person re-identification network, and person re-identification may be performed on the basis of the target person re-identification network.

In the person re-identification method according to the present application, obtaining a first type of person image without a label. Making label information for the first type of person image on the basis of a template matching method. Training a target person re-identification network on the basis of the first type of person image and the label information to obtain a first trained target person re-identification network. Extracting a region of interest in the first type of person image. Training, on the basis of the first type of person image and the region of interest, the first trained target person re-identification network to obtain a second trained target person re-identification network. Obtaining a third type of person image with a label, training the second trained target person re-identification network on the basis of the third type of person image to obtain a trained target person re-identification network, and performing person re-identification on the basis of the target person re-identification network.

In the present application, the label information may be made for the first type of person image on the basis of the template matching method, whereby a label is automatically and quickly added for the person image without a label. Thus, the target person re-identification network may be trained on the basis of the first type of person image and the label information to obtain the first trained target person re-identification network, that is, person information in the person image without a label may be configured to train the target person re-identification network. In addition, a region of interest in the first type of person image is further extracted. The first trained target person re-identification network is trained on the basis of the first type of person image and the region of interest to obtain the second trained target person re-identification network. Compared with a method for training a network on the basis of a person image with a label, a quantity of training samples is increased, and robustness of the target person re-identification network is improved.

Finally, the second trained target person re-identification network has a network weight value, the network weight value is compatible with the person image, and the person re-identification network in the existing art does not have an initial weight or an initial weight is incompatible with the person image, so convergence rate of the target person re-identification network may be accelerated and training efficiency of the target person re-identification network may be improved if the target person re-identification network is trained on the basis of the third type of person image in the present application, thereby improving operating efficiency of a person re-identification method. Compared with the existing art, applicability is higher.

In the person re-identification method according to the embodiment of the present application, in a process of making the label information for the first type of person image on the basis of the template matching method, body part boundary information in the first type of person image may be determined on the basis of the template matching method. The body part boundary information is taken as the label information of the first type of person image.

In an application scenario, in a process of determining the body part boundary information in the first type of person image on the basis of the template matching method, a preset human body part template may be obtained. The human body part template includes a head template, a torso template, and a lower limb template. A body part region corresponding to the human body part template in the first type of person image is determined. The body part region includes a head region, a torso region, and a lower limb region. Boundary coordinates of the body part region are determined. The boundary coordinates include a height value of a boundary of the body part region in the first type of person image. A ratio of the boundary coordinates to a total height of the first type of person image is taken as the body part boundary information.

It is to be noted that, in a process of obtaining the preset human body part template, some human body part images may be obtained, a human body part may be manually extracted as a human body part sample, and a scale of the body part sample may be standardized to a fixed scale to obtain the human body part template. Assuming that 100 samples are taken, all extracted human head images are subjected to gray scale normalization, and normalized head region samples of all 100 samples are normalized to obtain a human body region template and the like.

It is to be noted that, in a process of determining the body part region corresponding to the human body template in the first type of person image, temporary images with a same size as the human body part template may be segmented from the first type of person image, a similarity value between the temporary image and the human body part template may be calculated, and the similarity value may be recorded. This step is repeated until the similarity value between each temporary image in the first type of person image and the human body part template is obtained, and finally, the temporary image with a maximum similarity value is selected as the body part region corresponding to the human body part template in the first type of person image.

A calculation formula of the similarity value may be as follows:

$$c = \frac{\sum_{m=1}^{w}\sum_{n=1}^{h} S^{ij}(m,n) \times T(m,n)}{\sqrt{\sum_{m=1}^{w}\sum_{n=1}^{h} [S^{ij}(m,n)]^2} \sqrt{\sum_{m=1}^{w}\sum_{n=1}^{h} [T(m,n)]^2}};$$

Where, (i,j) represents a coordinate value of the temporary image; C represents the similarity value; $s^{ij}(m,n)$ represents a pixel value at coordinates (m,n) in the temporary image; T(m,n) represents a pixel value at coordinates (m,n) in the human body part template; and w×h represents a size of the human body part template.

It is to be noted that, in a process of taking the ratio of the boundary coordinates to the total height of the first type of person image as the body part boundary information, the body part boundary information may be determined on the basis of the following formulas:

$$h_0 = H1;$$
$$h_1 = \frac{B1 + H2}{2};$$
$$h_2 = \frac{B2 + F1}{2};$$
$$h_3 = F2;$$

Figure 4:
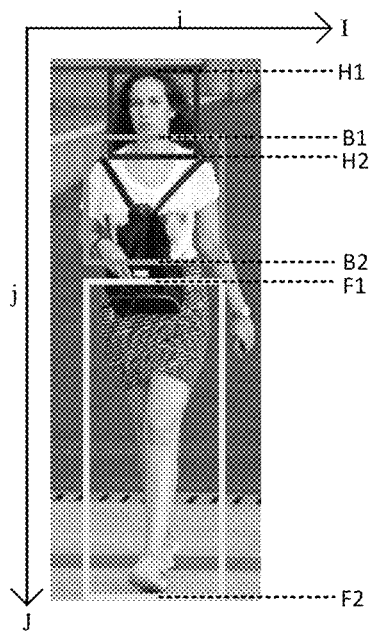
FIG. 4 is a schematic diagram of boundary coordinates of a person image.

Where, H1 represents an upper boundary coordinate of the head region, H2 represents a lower boundary coordinate of the head region, and B1 and B2 respectively represent an upper boundary coordinate and a lower boundary coordinate of the torso region; and F1 and F2 respectively a represent upper boundary coordinate and a lower boundary coordinate of the lower limb region. An example is as shown in FIG. 4. $h_0$ represents a starting boundary coordinate of the head region, $h_1$ represents a boundary coordinate between the head region and the torso region, $h_2$ represents a boundary coordinate between the torso region and the lower limb region, and $h_3$ represents an end boundary coordinate of the lower limb region. Assuming that a total height of the first type of person image is H, the final body part boundary information may be represented as:

$$H_0 = \frac{h_0}{H};$$
$$H_1 = \frac{h_1}{H};$$
$$H_2 = \frac{h_2}{H};$$
$$H_3 = \frac{h_3}{H}.$$

In the person re-identification method according to the embodiment of the present application, in a process of extracting a region of interest in the first type of person image, the following steps may be included:

Step 1: extracting a feature map previous to an average pooling layer of the Resnet50 network, and superimposing all channels of the feature map to obtain Class Activation Mapping (CAM).

In one or more embodiments, assuming that a dimension of the feature map is 1×C×H×W, 1 represents one image, and C represents a number of channels. Since the feature map output by a convolutional neural network at each layer contains a plurality of channels, H×W represents a size of the feature map, which is also referred to as the dimension of the feature map. All channels of the feature map are superposed to obtain a new feature map after all channels are fused, which has a dimension of 1×1×H×W, and is named as CAM in the present application. The CAM is a point set, and contains M elements, where CAM(x,y) represents a value at coordinate x and coordinate y of the feature map after the channels are fused.

Step 2: determining a real-time threshold value of the CAM on the basis of a hyper-parameter, and taking a pixel region in the first type of person image corresponding to the real-time threshold value greater than a preset threshold value as an initial region of interest.

In one or more embodiments, a value of the CAM may be normalized to a range of [0, 1] first on the basis of affine transformation of an extreme value, and then the real-time threshold value of the CAM is determined on the basis of the hyper-parameter and an indicator function. The indicator function means to take an element value satisfying a condition in parentheses as 1, otherwise as 0. A process is as follows:

$$CAM_1(x, y) = \frac{CAM(x, y) - \min CAM(x, y)}{\max CAM(x, y) - \min CAM(x, y)};$$

$$M(x, y) = CAM_1(x, y) \times \prod \{CAM_1(x, y) > \tau\};$$

Where, $CAM_1(x,y)$ represents the normalized CAM(x,y). M(x,y) represents the determined real-time threshold value; represents the indicator function; and τ represents the hyper-parameter.

Step 3: searching a connected component in the initial region of interest, and determining the region of interest on the basis of the connected component.

In one or more embodiments, a connected region refers to that there is a value other than 0 in a 4-quadrant neighborhood adjacent to a pixel, then this pixel is connected with peripheral pixels. Searching the connected component is to traverse all elements in a matrix M(x,y) in sequence to obtain values of 4-quadrant neighborhood connectivity of all pixels. Whenever there is connectivity, a value of 1 is assigned, whereby the matrix M(x,y) becomes a binary matrix. After that, the area of connected regions of the matrix M(x,y) is counted. For example, the area of each connected component is determined by calculating a number of pixels in the connected region. If the area of the connected region is too small, all elements in the connected region is set as 0, the connected region is discarded, and a remaining connected region is the region of interest.

Figure 5:
FIG. 5 is a schematic diagram of a region of interest.

Step 4: determining bounding box information of the region of interest. An example may be shown in FIG. 5.

In one or more embodiments, assuming that a point set of the region of interest is Ω, the bounding box information is $(x_c, y_c, w, h)$, the bounding box information may be obtained by matching a first moment and a second moment (a mean and a variance) with a rectangle. A calculation process is as follows:

$$x_c = \frac{x_{min} + x_{max}}{2};$$

$$y_c = \frac{y_{min} + y_{max}}{2};$$

$$w = \sqrt{12\frac{\sum_{(x,y)\in\Omega} M(x,y)(x-x_c)^2}{\sum_{(x,y)\in\Omega} M(x,y)}};$$

$$h = \sqrt{12\frac{\sum_{(x,y)\in\Omega} M(x,y)(y-y_c)^2}{\sum_{(x,y)\in\Omega} M(x,y)}};$$

Where, $x_{min}$ represents an X-coordinate minimum value of all elements in a point set of the region of interest, and $x_{max}$ represents a X-coordinate maximum value of all elements in the point set of the region of interest; $x_{min}$ represents a y-coordinate minimum value of all elements in the point set of the region of interest, and $y_{max}$ represents a y-coordinate maximum value of all elements in the point set of the region of interest; h and W represent a width and a height of the bounding box information; ($x_c$, $y_c$) represents left vertex coordinates of the bounding box information; $\Omega$ represents the point set of the region of interest; (x,y) represents a pixel in the region of interest; and M(x,y) represents the real-time threshold value.

In practical applications, step 2 to step 4 may be repeated by using different hyper-parameters to obtain a plurality of pieces of bounding box information in a process of training a second target network. The second target network may obtain final bounding box information of all regions of interest on the basis of an Intersection over Union (IoU) among various pieces of bounding box information and in combination with Non-Maximum Suppression (NMS).

It is to be noted that in combination with the NMS is a process of merging a plurality of boxes with particularly severe overlap into one box. In one or more embodiments, all bounding box information may be traversed in sequence, and degree of overlap between the currently traversed bounding box information and all other bounding boxes of the region of interest may be queried. If the IoU between the bounding boxes of the all other regions of interest and the currently traversed boxes is greater than a certain threshold value, a box with a larger overlap is deleted, and all boxes are traversed to complete the process described above.

In a person re-identification method according to the embodiments of the present application, a training process of a neural network is divided into two stages. A first stage is a stage of propagating data from a low level to a high level, that is, a forward propagation stage. The other stage is a stage of propagating an error from a high level to a low level for training in response to a determination that a result obtained by the forward propagation stage do not conform to an expectation, that is, a back-propagation stage. A training process may include the following steps:

performing initialization, generally, random initialization, on a weight of a network layer;
inputting image data to obtain an output value through forward propagation of various layers such as a convolutional layer, a downsampling layer, and a fully connected layer;
solving an error between an output value of a network and a target value (a label) by a method as follows: solving the output value of the network and loss of the output value of the network and an input pseudo label;
back propagating the error into the network to solve back propagation errors of various layers such as the fully connected layer and the convolutional layer of the network in sequence;
adjusting all weight coefficients in the network by each layer of the network according to the back-propagation error of each layer, that is, updating the weights;
randomly re-selecting new image data, then entering the second step to obtain the output value obtained by the forward propagation of the network;
iterating reciprocally and infinitely, and ending training in response to a determination that the solved error between the output value of the network and the target value (the label) is less than a certain threshold value or a number of iterations exceeds a certain threshold value; and
saving network parameters of all trained layers.

Figure 6:
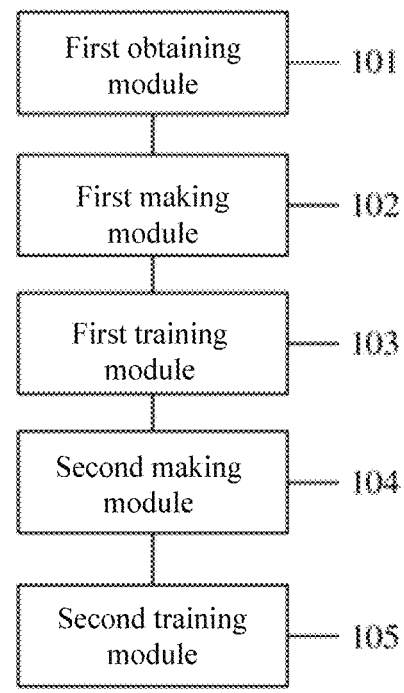
FIG. 6 is a schematic structural diagram of a person re-identification system according to one or more embodiments of the present application.

Please refer to FIG. 6, which is a schematic structural diagram of a person re-identification system according to an embodiment of the present application.

The person re-identification system according to the embodiment of the present application may include: a first obtaining module 101, configured to obtain a first type of person image without a label; a first making module 102, configured to make label information for the first type of person image; a first training module 103, configured to train a target person re-identification network on a basis of the first type of person image and the label information to obtain a first trained target person re-identification network; a second making module 104, configured to extract a region of interest in the first type of person image; and a second training module 105, configured to train, on a basis of the first type of person image and the region of interest, the first trained target person re-identification network to obtain a second trained target person re-identification network, and perform person re-identification on a basis of the target person re-identification network.

In the person re-identification system according to the embodiment of the present application, the first making module may include:
a first determination unit, configured to determine body part boundary information in the first type of person image; and
a first setting unit, configured to take the body part boundary information as the label information of the first type of person image.

In the person re-identification system according to the embodiment of the present application, the first determination unit may be configured to determine the body part boundary information in the first type of person image on a basis of a template matching method.

In the person re-identification system according to the embodiment of the present application, the first determination unit may be configured to: obtain a preset human body part template; determine a body part region corresponding to the human body part template in the first type of person image; determine boundary coordinates of the body part region, the boundary coordinates including a height value of a boundary of the body part region in the first type of person image; and take a ratio of the boundary coordinates to a total height of the first type of person image as the body part boundary information.

In the person re-identification system according to the embodiment of the present application, the human body part template includes a head template, a torso template, and a lower limb template. The body part region includes a head region, a torso region, and a lower limb region. The body part boundary information includes starting boundary information of the head region, boundary information between the head region and the torso region, boundary information between the torso region and the lower limb region, and ending boundary information of the lower limb region.

In the person re-identification system according to the embodiment of the present application, the first determination unit may be configured to: segment a temporary images with a same size as the human body part template from the first type of person image, calculate a similarity value of each temporary image and the human body part template, and select a temporary image with a maximum similarity value as the body part region corresponding to the human body part template in the first type of person image.

In the person re-identification system according to the embodiment of the present application, the first determination unit may be configured to calculate the similarity value between each temporary image and the human body part template on a basis of a similarity calculation formula.

The similarity calculation formula includes:

$$c = \frac{\sum_{m=1}^{w}\sum_{n=1}^{h} S^{ij}(m,n) \times T(m,n)}{\sqrt{\sum_{m=1}^{w}\sum_{n=1}^{h}[S^{ij}(m,n)]^2}\sqrt{\sum_{m=1}^{w}\sum_{n=1}^{h}[T(m,n)]^2}};$$

Where, (i,j) represents a coordinate value of the temporary image; C represents the similarity value; $s^{ij}(m,n)$ represents a pixel value at a coordinate (m,n) in the temporary image; T(m,n) represents a pixel value at the coordinate (m,n) in the human body part template; and w×h represents a size of the human body part template.

In the person re-identification system according to the embodiment of the present application, the first training module may include: a first construction unit, configured to connect the target person re-identification network to a first auxiliary network to obtain a first target network; a first training unit, configured to train the first target network on the basis of the first type of person image and the label information to obtain a trained first target network; and a first deletion unit, configured to remove the first auxiliary network from the first target network to obtain a first trained target person re-identification network.

In the person re-identification system according to the embodiment of the present application, the target person re-identification network includes a ResNet50 network. The first auxiliary network includes a fully connected layer connected to a seventh part of the ResNet50 network.

In the person re-identification system according to the embodiment of the present application, the second making module may include:
a first extraction unit, configured to extract a feature map previous to an average pooling layer of the target person re-identification network;
a first superposition unit, configured to superimpose all channels of the feature map to obtain CAM;
a second determination unit, configured to determine a real-time threshold value of the CAM on the basis of a hyper-parameter, and take a pixel region in the first type of person image corresponding to the real-time threshold value greater than a preset threshold value as an initial region of interest;
a third determination unit, configured to search a connected component in the initial region of interest, and determine a region of interest on the basis of the connected component; and
a fourth determination unit, configured to determine bounding box information of the region of interest.

The person re-identification system according to the embodiment of the present application further includes:
a normalization unit, configured to normalize a value of the CAM to a range of [0, 1] on a basis of affine transformation of an extreme value after the first superposition unit superimposes all channels of the feature map to obtain the CAM and before the second determination unit determines the real-time threshold value of the CAM on the basis of the hyper-parameter.

In the person re-identification system according to the embodiment of the present application, the fourth determination unit may be configured to determine the bounding box information of the region of interest area on a basis of a bounding box information determination formula.

The bounding box information determination formula includes:

$$x_c = \frac{x_{min} + x_{max}}{2};$$

$$y_c = \frac{y_{min} + y_{max}}{2};$$

$$w = \sqrt{12\frac{\sum_{(x,y)\in\Omega} M(x,y)(x-x_c)^2}{\sum_{(x,y)\in\Omega} M(x,y)}};$$

$$h = \sqrt{12\frac{\sum_{(x,y)\in\Omega} M(x,y)(y-y_c)^2}{\sum_{(x,y)\in\Omega} M(x,y)}};$$

Where, $x_{min}$ represents an X-coordinate minimum value of all elements in a point set of the region of interest, and $x_{max}$ represents a X-coordinate maximum value of all elements in the point set of the region of interest; $y_{min}$ represents a y-coordinate minimum value of all elements in the point set of the region of interest, and $y_{max}$ represents a y-coordinate maximum value of all elements in the point set of the region of interest; h and W represent a width and a height of the bounding box information; ($x_c$, $y_c$) represents left vertex coordinates of the bounding box information; $\Omega$ represents the point set of the region of interest; (x,y) represents a pixel in the region of interest; and M(x,y) represents the real-time threshold value.

In the person re-identification system according to the embodiment of the present application, the second training module may include:
a second construction unit, configured to connect the first trained target person re-identification network to a second auxiliary network to obtain a second target network;
a second training unit, configured to train the second target network on the basis of the first type of person image and the region of interest to obtain a trained second target network; and
a second deletion unit, configured to remove the second auxiliary network from the second target network to obtain a second trained target person re-identification network.

In the person re-identification system according to the embodiment of the present application, the target person re-identification network includes a ResNet50 network. The second auxiliary network includes an image detection network connected to a feature map of a pooling layer of a sixth part of the ResNet50 network. The image detection network includes a candidate region determination network, a candidate region selection network, and a region of interest regression network.

Figure 7:
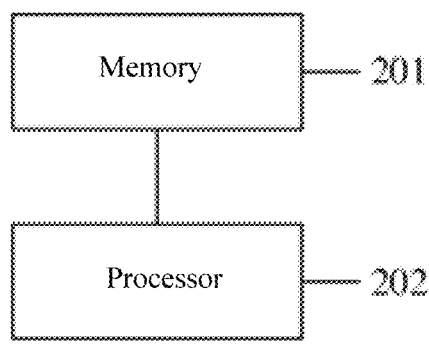
FIG. 7 is a schematic structural diagram of a person re-identification device according to one or more embodiments of the present application.

The present application further provides a person re-identification device and a non-transitory computer-readable storage medium, which both have corresponding effects of a person re-identification method according to the embodiment of the present application. Please refer to FIG. 7, which is a schematic structural diagram of a person re-identification device according to an embodiment of the present application.

The person re-identification device according to an embodiment of the present application, including a memory 201 and one or more processors 202. The memory 201 stores computer-readable instructions. The processor 202 implements steps of the person re-identification method according to any of the embodiments described above in response to a determination that executing the computer-readable instructions.

Figure 8:
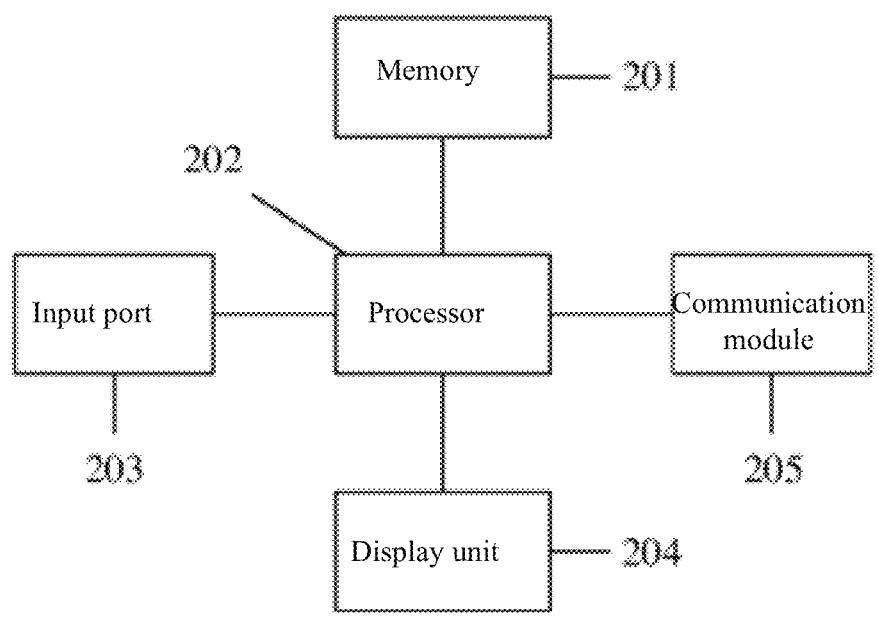
FIG. 8 is another schematic structural diagram of the person re-identification device according to one or more embodiments of the present application.

Referring to FIG. 8, another person re-identification device according to the embodiment of the present application may include: an input port 203 connected to a processor 202 (which may include one or more), configured to transmit an externally input command to the processor 202; a display unit 204 connected to the processor 202, configured to display a processing result of the processor 202 to the outside world; and a communication module 205 connected to the processor 202, configured to achieve communication between the person re-identification device and the outside world. The display unit 204 may be a display panel, a laser scanning display, or the like. A communication manner used by the communication module 205 includes, but is not limited to, a Mobile High-Definition Link Technology (HML), a Universal Serial Bus (USB), a High-Definition Multimedia Interface (HDMI), and wireless connection: a Wireless Fidelity Technology (WiFi), a Bluetooth Communication Technology, a Low-Power Bluetooth Communication Technology, and an IEEE802.11s-based Communication Technology.

Figure 9:
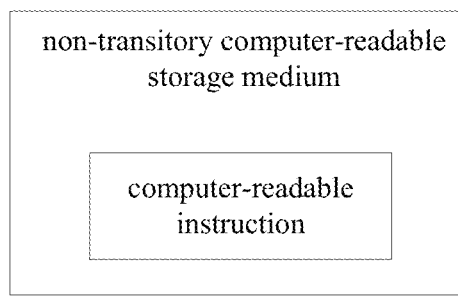
FIG. 9 is a schematic structural diagram of a non-transitory computer-readable storage medium according to one or more embodiments of the present application.

As shown in FIG. 9, the non-transitory computer-readable storage medium according to the embodiment of the present application stores computer-readable instructions. The computer-readable instructions implement steps of the person re-identification method according to any of the embodiments described above when executed by a processor.

The non-transitory computer-readable storage medium involved in the present application includes a Random Access Memory (RAM), a Memory, a Read-Only Memory (ROM), an Electrically Programmable ROM, an Electrically Erasable Programmable ROM, a register, a hard disc, a removable disc, a Compact Disc (CD)-ROM, or any other form of storage medium known in the technical field.

Descriptions of related parts in the person re-identification system and device and a non-transitory computer-readable storage medium according to the embodiments of the present application refer to detailed descriptions of corresponding parts in the person re-identification method according to the embodiment of the present application, which will not be repeated here. In addition, parts of the above technical solutions according to the embodiment of the present application that have consistent implementation principles with the corresponding technical solutions in the existing technology are not described in detail to avoid excessive repetition.

It is also to be noted that relational terms such as first and second are merely used for distinguishing one entity or operation from another entity or operation herein, and do not necessarily require or imply the existence of any such actual relationship or order between these entities or operations. Moreover, the terms "include", "contain" or any other variations thereof are intended to cover a non-exclusive inclusion, such that a process, method, article or device including a series of elements not only includes those elements, but also includes those elements that are not explicitly listed, or includes elements inherent to such a process, method, article or device. In the absence of more restrictions, elements defined by the phrase "include a/an . . . " do not exclude the existence of additional identical elements in the process, method, commodity, or device that includes the elements.

The above-mentioned description for the disclosed embodiments enables those skilled in the art to implement or use the present application. Various modifications made to these embodiments will be apparent to those skilled in the art, and the general principles defined herein may be implemented in other embodiments without departing from the spirit or scope of the present application. Therefore, the present application will not be limited to these embodiments shown herein, but will conform to the widest scope consistent with the principles and novel features disclosed herein.

The invention claimed is:
1. A person re-identification method, comprising:
obtaining a first type of person image without a label;
making label information for the first type of person image;
training a target person re-identification network on a basis of the first type of person image and the label information to obtain a first trained target person re-identification network;
extracting a region of interest in the first type of person image; and
training, on a basis of the first type of person image and the region of interest, the first trained target person re-identification network to obtain a second trained target person re-identification network, and performing person re-identification on a basis of the target person re-identification network;
wherein the making label information for the first type of person image comprises:
determining body part boundary information in the first type of person image; and
taking the body part boundary information as the label information of the first type of person image;
wherein the extracting a region of interest in the first type of person image comprises:
extracting a feature map previous to an average pooling layer of the target person re-identification network;
superimposing all channels of the feature map to obtain Class Activation Mapping (CAM);
determining a real-time threshold value of the CAM on a basis of a hyper-parameter, and taking a pixel region in the first type of person image corresponding to the real-time threshold value greater than a preset threshold value as an initial region of interest;

searching a connected component in the initial region of interest, and determining the region of interest on a basis of the connected component; and determining bounding box information of the region of interest.

2. The method according to claim 1, wherein the determining body part boundary information in the first type of person image comprises:

determining the body part boundary information in the first type of person image on a basis of a template matching method.

3. The method according to claim 2, wherein the determining the body part boundary information in the first type of person image on a basis of a template matching method comprises:

obtaining a preset human body part template;

determining a body part region corresponding to the preset human body part template in the first type of person image;

determining boundary coordinates of the body part region, the boundary coordinates comprising a height value of a boundary of the body part region in the first type of person image; and taking a ratio of the boundary coordinates to a total height of the first type of person image as the body part boundary information.

4. The method according to claim 3, wherein the preset human body part template comprises a head template, a torso template, and a lower limb template;

the body part region comprises a head region, a torso region, and a lower limb region; and the body part boundary information comprises starting boundary information of the head region, boundary information between the head region and the torso region, boundary information between the torso region and the lower limb region, and ending boundary information of the lower limb region.

5. The method according to claim 4, wherein the determining a body part region corresponding to the preset human body part template in the first type of person image comprises:

segmenting temporary images with a same size as the preset human body part template from the first type of person image;

calculating a similarity value of each of the temporary images and the preset human body part template; and selecting a temporary image with a maximum similarity value from the temporary images as the body part region corresponding to the preset human body part template in the first type of person image.

6. The method according to claim 5, wherein the calculating a similarity value of each of the temporary images and the preset human body part template comprises:

calculating the similarity value of each of the temporary images and the preset human body part template on a basis of a similarity calculation formula;

the similarity calculation formula comprises:

$$c = \frac{\sum_{m=1}^{w}\sum_{n=1}^{h} S^{ij}(m,n) \times T(m,n)}{\sqrt{\sum_{m=1}^{w}\sum_{n=1}^{h}[S^{ij}(m,n)]^2} \sqrt{\sum_{m=1}^{w}\sum_{n=1}^{h}[T(m,n)]^2}};$$

wherein, (i,j) represents a coordinate value of the temporary image; C represents the similarity value; $s^{ij}(m,n)$ represents a pixel value at a coordinate (m,n) in the temporary image; T(m,n) represents a pixel value at the coordinate (m,n) in the preset human body part template; and w×h represents a size of the preset human body part template.

7. The method according to claim 4, wherein the body part boundary information is determined on a basis of following formulas:

$$h_0 = H1;$$

$$h_1 \frac{B1+H2}{2};$$

$$h_2 = \frac{B2+F1}{2};$$

$$h_3 = F2;$$

$$H_0 = \frac{h_0}{H};$$

$$H_1 = \frac{h_1}{H};$$

$$H_2 = \frac{h_2}{H};$$

$$H_3 = \frac{h_3}{H};$$

wherein $H_0$, $H_1$, $H_2$, and $H_3$ represent the body part boundary information; H1 represents an upper boundary coordinate of the head region; H2 represents a lower boundary coordinate of the head region; B1 and B2 respectively represent an upper boundary coordinate and a lower boundary coordinate of the torso region; F1 and F2 respectively represent an upper boundary coordinate and a lower boundary coordinate of the lower limb region; $h_0$ represents a starting boundary coordinate of the head region; $h_1$ represents a boundary coordinate between the head region and the torso region; $h_2$ represents a boundary coordinate between the torso region and the lower limb region; $h_3$ represents an end boundary coordinate of the lower limb region; and H represents the total height of the first type of person image.

8. The method according to claim 1, wherein the training a target person re-identification network on a basis of the first type of person image and the label information to obtain a first trained target person re-identification network comprises:

connecting the target person re-identification network to a first auxiliary network to obtain a first target network;

training the first target network on the basis of the first type of person image and the label information to obtain a trained first target network; and removing the first auxiliary network from the trained first target network to obtain the first trained target person re-identification network.

9. The method according to claim 8, wherein the target person re-identification network comprises a ResNet50 network; and the first auxiliary network comprises a fully connected layer connected to a seventh part of the ResNet50 network.

10. The method according to claim 9, wherein a first part of the target person re-identification network does not contain a residual block, and is configured to perform calculations of convolution, regularization, activation function, and maximum pooling on an input; and structures of a second part, a third part, a fourth part, and a fifth part of the target person re-identification network contain residual blocks, and each of the residual blocks contains three layers of convolution.

11. The method according to claim 9, wherein the fully connected layer contains at least one neuron.

12. The method according to claim 1, wherein after the superimposing all channels of the feature map to obtain CAM and before the determining a real-time threshold value of the CAM on a basis of a hyper-parameter, further comprising:

normalizing a value of the CAM to a range of [0, 1] on a basis of affine transformation of an extreme value.

13. The method according to claim 12, wherein the determining bounding box information of the region of interest comprises:

determining the bounding box information of the region of interest on a basis of a bounding box information determination formula;

the bounding box information determination formula comprises:

$$x_c = \frac{x_{min} + x_{max}}{2};$$

$$y_c = \frac{y_{min} + y_{max}}{2};$$

$$w = \sqrt{12\frac{\sum_{(x,y)\in\Omega} M(x,y)(x-x_c)^2}{\sum_{(x,y)\in\Omega} M(x,y)}};$$

$$h = \sqrt{12\frac{\sum_{(x,y)\in\Omega} M(x,y)(y-y_c)^2}{\sum_{(x,y)\in\Omega} M(x,y)}};$$

wherein, $x_{min}$ represents an x-coordinate minimum value of all elements in a point set of the region of interest, and $x_{max}$ represents a X-coordinate maximum value of all elements in the point set of the region of interest; $y_{min}$ represents a y-coordinate minimum value of all elements in the point set of the region of interest, and $y_{max}$ represents a Y-coordinate maximum value of all elements in the point set of the region of interest; h and W represent a width and a height of the bounding box information; ($x_c$, $y_c$) represents left vertex coordinates of the bounding box information; $\Omega$ represents the point set of the region of interest; (x,y) represents a pixel in the region of interest; and M(x,y) represents the real-time threshold value.

14. The method according to claim 13, wherein the training, on a basis of the first type of person image and the region of interest, the first trained target person re-identification network to obtain a second trained target person re-identification network comprises:

connecting the first trained target person re-identification network to a second auxiliary network to obtain a second target network;

training the second target network on the basis of the first type of person image and the region of interest to obtain a trained second target network; and removing the second auxiliary network from the trained second target network to obtain the second trained target person re-identification network.

15. The method according to claim 14, wherein the target person re-identification network comprises a ResNet50 network;

the second auxiliary network comprises an image detection network connected to a sixth part of the ResNet50 network; and the image detection network comprises a candidate region determination network, a candidate region selection network, and a region of interest regression network.

16. The method according to claim 1, wherein the performing person re-identification on a basis of the target person re-identification network comprises:

obtaining a third type of person image with a label, and training the second trained target person re-identification network on a basis of the third type of person image to obtain a trained target person re-identification network for performing person re-identification on a basis of the target person re-identification network.

17. The method according to claim 1, wherein the determining bounding box information of the region of interest comprises:

obtaining a plurality of pieces of bounding box information by using different hyper-parameters;

traversing all bounding box information in sequence, and querying degree of overlap between currently traversed bounding box information and bounding boxes of all other regions of interest;

in response to a determination that an Intersection over Union (IoU) between the bounding boxes of all other regions of interest and the currently traversed bounding box is greater than a threshold value, deleting bounding box information with a larger overlap; and obtaining the bounding box information of all regions of interest after traversing all bounding box information.

18. A person re-identification device, comprising:

a memory storing computer-readable instructions; and a processor configured to execute the computer-readable instructions wherein the one or more processor, upon execution of the computer-readable instructions, is configured to:

obtain a first type of person image without a label;

make label information for the first type of person image;

train a target person re-identification network on a basis of the first type of person image and the label information to obtain a first trained target person re-identification network;

extract a region of interest in the first type of person image; and train, on a basis of the first type of person image and the region of interest, the first trained target person re-identification network to obtain a second trained target person re-identification network, and perform person re-identification on a basis of the target person re-identification network;

wherein the making label information for the first type of person image comprises:

determining body part boundary information in the first type of person image; and taking the body part boundary information as the label information of the first type of person image;

wherein the extracting a region of interest in the first type of person image comprises:

extracting a feature map previous to an average pooling layer of the target person re-identification network;

superimposing all channels of the feature map to obtain Class Activation Mapping (CAM);

determining a real-time threshold value of the CAM on a basis of a hyper-parameter, and taking a pixel region in the first type of person image corresponding to the real-time threshold value greater than a preset threshold value as an initial region of interest;

searching a connected component in the initial region of interest, and determining the region of interest on a basis of the connected component; and determining bounding box information of the region of interest.

19. A non-transitory computer-readable storage medium, storing computer-readable instructions executed by one or more processors and upon execution by the one or more processors, are configured to cause the one or more processors to:

obtain a first type of person image without a label;

make label information for the first type of person image;

train a target person re-identification network on a basis of the first type of person image and the label information to obtain a first trained target person re-identification network;

extract a region of interest in the first type of person image; and train, on a basis of the first type of person image and the region of interest, the first trained target person re-identification network to obtain a second trained target person re-identification network, and perform person re-identification on a basis of the target person re-identification network;

wherein the making label information for the first type of person image comprises:

determining body part boundary information in the first type of person image; and taking the body part boundary information as the label information of the first type of person image;

wherein the extracting a region of interest in the first type of person image comprises:

extracting a feature map previous to an average pooling layer of the target person re-identification network;

superimposing all channels of the feature map to obtain Class Activation Mapping (CAM);

determining a real-time threshold value of the CAM on a basis of a hyper-parameter, and taking a pixel region in the first type of person image corresponding to the real-time threshold value greater than a preset threshold value as an initial region of interest;

searching a connected component in the initial region of interest, and determining the region of interest on a basis of the connected component; and determining bounding box information of the region of interest.

* * * * *